United States Patent [19]

Whitcomb

[11] Patent Number: 4,753,037
[45] Date of Patent: Jun. 28, 1988

[54] PLANT GROWING METHOD AND CONTAINER

[75] Inventor: Carl E. Whitcomb, Stillwater, Okla.

[73] Assignee: Lacebark Publications, Stillwater, Okla.

[21] Appl. No.: 847,751

[22] Filed: Apr. 3, 1986

[51] Int. Cl.[4] ............................................. A01G 23/02
[52] U.S. Cl. .......................................... 47/73; 47/77; 47/87
[58] Field of Search ................... 47/33, 66, 67, 73–81, 47/87

[56] References Cited

U.S. PATENT DOCUMENTS

| | | | |
|---|---|---|---|
| 2,859,557 | 11/1958 | Lattuca | 47/66 |
| 3,667,159 | 6/1972 | Todd | 47/87 |
| 4,031,832 | 6/1977 | Edwards | 47/73 |
| 4,242,834 | 1/1981 | Olsen | 47/73 |
| 4,442,628 | 4/1984 | Whitcomb | 47/66 |
| 4,494,132 | 2/1985 | Whitcomb | 47/66 |

FOREIGN PATENT DOCUMENTS

| | | | |
|---|---|---|---|
| 1470367 | 1/1967 | France | 47/79 |
| 2374840 | 8/1978 | France | 47/71 |
| 24139 | 6/1915 | United Kingdom | 47/80 |

*Primary Examiner*—James R. Feyrer
*Attorney, Agent, or Firm*—Laney, Dougherty, Hessin & Beavers

[57] ABSTRACT

An improved method and container for growing a plant intended to be transplanted are provided. The side wall of the container includes at least one upwardly facing internal ledge positioned substantially horizontally therein and a plurality of spaced openings are disposed on the side wall and extend through the ledge. A portion of the roots growing laterally within the container are trapped by the ledge, are guided through the openings and are air-pruned as a result thereof.

19 Claims, 2 Drawing Sheets

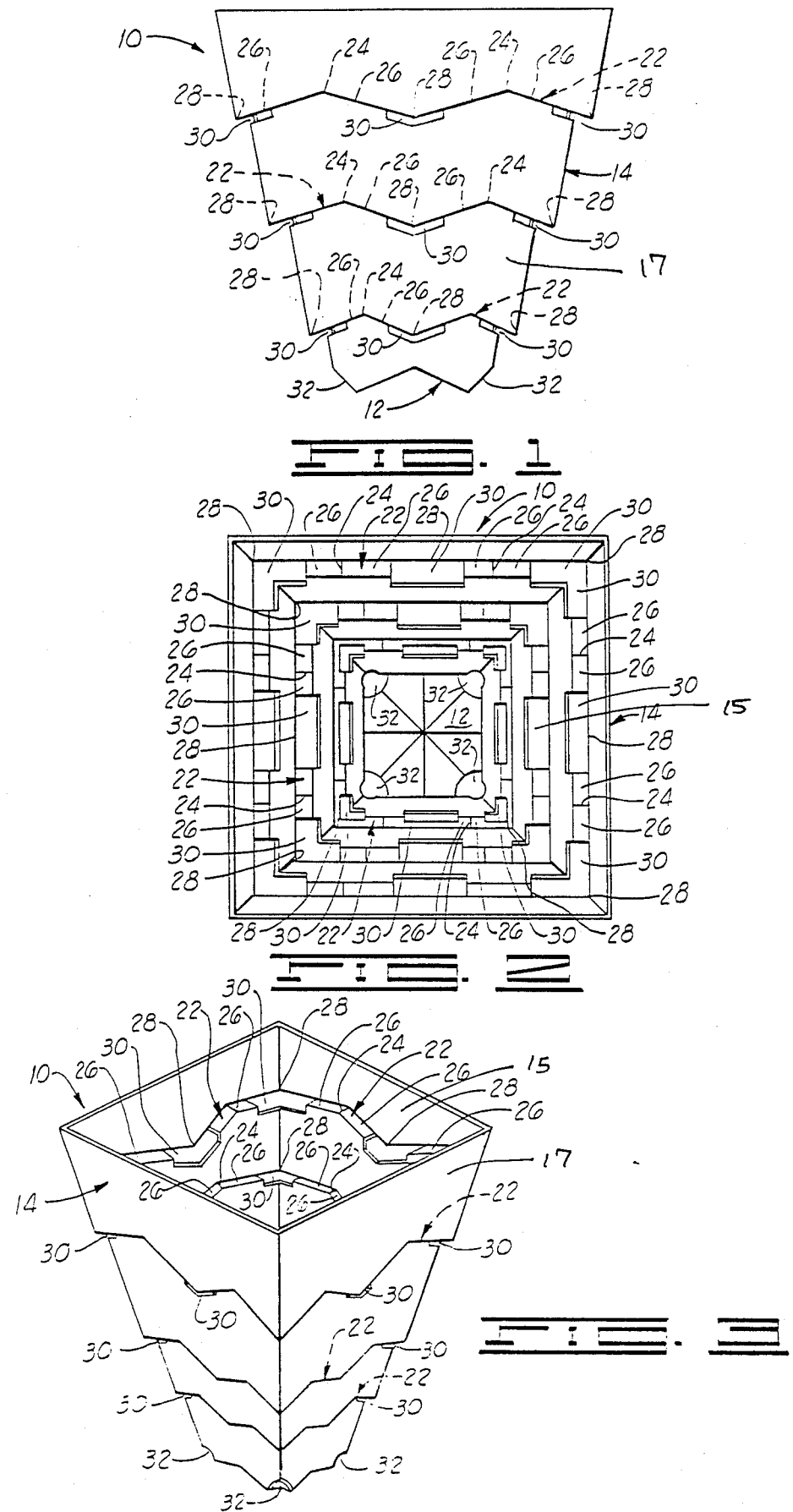

PLANT GROWING METHOD AND CONTAINER

BACKGROUND OF THE INVENTION

1. Field of the Invention

The present invention relates generally to plant growing methods and containers, and more particularly, to methods and containers involving air-root-pruning of growing plants intended to be transplanted.

2. Description of the Prior Art

Landscape plants and other plants intended to be transplanted have for some time been grown out-of-doors in containers above ground. Container-grown plants can be grown at a faster rate than those grown in the field, and because the roots of container plants are not severed or otherwise disturbed when the plants are transplanted, such transplanting can take place at any time during the year, not just during the early spring as required with bare root or bagged nursery stock.

A variety of containers for growing plants intended to be transplanted have been developed and used heretofore, beginning with metal cans having holes punched in the bottoms and progressing to the present-day specifically designed plastic containers. However, problems experienced in growing plants in all such containers, especially woody plants, include spiral root growth and/or downward root orientation with little lateral root development. That is, as a lateral root grows in a container, its path is outward towards the side of the container and downward. When the root reaches a side of the container it follows the contour of the container to the bottom, and when it reaches the bottom, it often continues to grow in a circle. In some containers having open bottoms, the roots are air-pruned when they reach the bottom thereby substantially preventing spiral root growth, but the root tips are at the bottom of the container rather than along the sides. It has been shown that the root growth of container-grown plants after being transplanted primarily involves extensions of roots which were present in the container at the time of transplanting as opposed to the development of new roots. Consequently, the number and the position of root tips present at the time of transplanting is important to the rapid establishment, and frequently, the survival of container-grown plants.

Landscape plants have commonly been grown in square bottomless containers placed on wire surfaces whereby roots reaching the bottom of the container are air-pruned. However, most of the root tips produced end up at the bottom of the container, and the requirement of placing the containers on wire screen surfaces generally makes the practice uneconomical. Further, such open bottom containers are not easily moved without spilling or losing growth medium contained therein.

More recently, containers have been developed for controlling spiral root growth whereby the root tips are physically trapped by surfaces in the container and are prevented from elongating, or the circling root tips are caused to pass through vertical openings in the sides of the container whereby the tips are air-pruned. An example of the root trapping type of container is described in U.S. Pat. No. 4,442,628 issued Apr. 17, 1984. An example of a container including vertical side wall openings for air-pruning circling roots is described in U.S. Pat. No. 4,497,132 issued Feb. 5, 1985. While such root trapping and air-root-pruning containers have been utilized successfully, some spiral root growth still takes place and the development of lateral root tips has been less than optimum.

By the present invention an improved container for growing plants intended to be transplanted is provided whereby spiral root growth is prevented and the development of lateral root and branched root tips along and around the sides of the container is maximized.

SUMMARY OF THE INVENTION

An improved container for growing a plant intended to be transplanted is provided. The container is comprised of a bottom wall and an upwardly extending side wall connected to the perimeter of the bottom wall forming a container having an open top. The side wall includes an inside surface, an outside surface and at least one upwardly facing internal ledge positioned substantially horizontally on said inside surface and a plurality of spaced side openings disposed therein, each of said side openings extending through the ledge side wall. Roots growing laterally within the container are trapped by the ledge, are guided through the side openings and are air-pruned as a result thereof. Methods of growing plants for transplantation in a growing medium contained in a container are also provided.

It is, therefore, an object of the present invention to provide an improved plant growing container.

Another object of the present invention is the provision of an improved container and method for growing a plant intended to be transplanted whereby spiral root growth is prevented and the development of lateral root tips along and around the sides of the container is maximized.

A further object of the present invention is the provision of a container and method for growing a plant intended to be transplanted whereby the rate of growth of lateral roots and roots branched therefrom while the plant is confined within the container is maximized resulting in rapid root growth in all directions and at all levels after transplanting thereby quickly anchoring the plant and provided water and nutrients required for continued growth.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side elevational view of a plant growing container of the present invention.

FIG. 2 is a top plan view of the container of FIG. 1.

FIG. 3 is a perspective view of the container of FIGS. 1 and 2.

DESCRIPTION OF PREFERRED EMBODIMENTS

Figure 4:
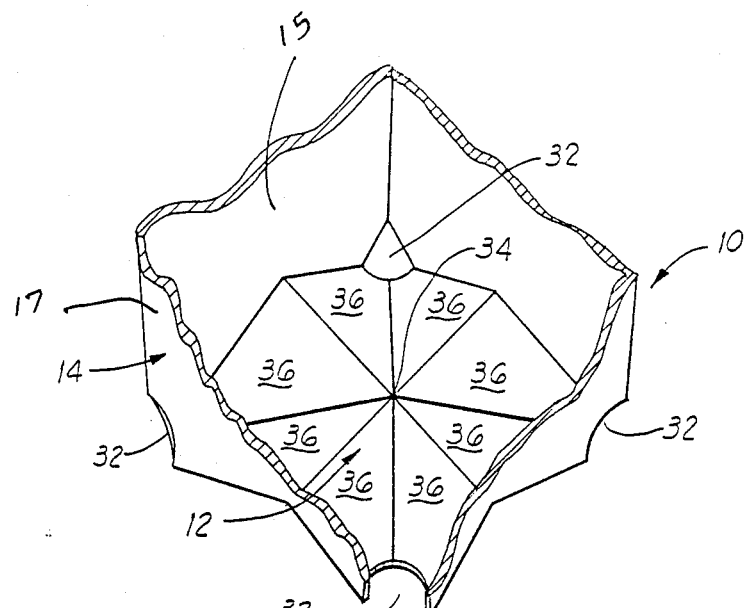
FIG. 4 is an enlarged cut-away view of the bottom portion of the container of FIG. 3.

In the typical root growth of a germinating seed in a container, a tap root forms first and quickly grows to the bottom of the container where it changes direction and continues to grow unless it becomes physically trapped or exits the container and is air-pruned. In either event, the tap root growth is terminated, and as a result, the apical dominance of the root tip is lost and the development of secondary lateral roots along the length of the tap root within the container occurs. The secondary lateral roots generally grow outwardly towards the sides of the container and slightly downwardly. When the lateral roots contact the sides of the container, unless trapped in some manner by the container, they grow downwardly towards the bottom of the container where they may continue to grow in a circular pattern or their growth may be terminated as a result of being physically trapped or air-pruned. When plants having root growth of the type described above are transplanted, the downwardly orientated roots at the bottom of the root growth provide little or no lateral anchorage of the plant, and the root tips are at a depth in the soil where aeration is less favorable. In addition, the downwardly orientated roots are intermingled with each other and as such roots increase in diameter with age, they exert pressure on one another which restricts the normal flow of water and nutrients from the root tips to the top of the plant as well as the downward flow of energy from the leaves.

The present invention provides an improved method and container for growing a plant intended to be transplanted whereby the tap root is initially quickly air-pruned and the lateral root growth is air-pruned at all levels along the sides of the container which promotes root branching from the lateral roots thereby maximizing lateral root tip production. Upon transplantation, root tips are present at all levels in the growth medium, and new roots grow in all directions around the plant, quickly anchoring the plant and providing rapid absorption of water and nutrients.

Referring now to the drawings, and particularly to FIGS. 1-4, a plant growing container of the present invention is illustrated and generally designated by the numeral 10. The container 10 is comprised of a bottom wall 12 and an upwardly extending side wall 14. The side wall 14 is connected to the perimeter of the bottom wall 12 which together form the container 10 having an open top. The side wall 14 includes an inside surface 15 and an outside surface 17. As illustrated in FIGS. 1-4, the side wall 14 is of an inverted truncated pyramidal shape having a square horizontal cross section. While such a container shape is presently preferred, other container shapes can be utilized. For example, as shown in FIG. 5, a container 16 of the present invention includes a circular bottom wall 18 and an upwardly extending side wall 20 connected to the perimeter of the bottom wall 18. The side wall 18 includes an inside surface 19 and an outside surface (not shown). The bottom and side walls 18 and 20 form the open-top container 16 of circular horizontal cross section and overall inverted truncated conical shape.

Referring particularly to FIGS. 1-4, the side wall 14 of the container 10 includes a plurality of upwardly facing substantially horizontal internal ledges 22 formed on the inside surface thereof. The ledges 22 are positioned in spaced relationship one above the other, and each of the ledges 22 extends around the interior of the side wall 14. As best shown in FIGS. 1 and 3, each of the ledges 22 follows an undulating path around the side wall 14. That is, each of the ledges 22 includes a plurality of apexes 24 formed by adjacent downwardly sloping ledge portions 26 which intersect at low points 28.

Positioned at the area of each of the low points 28 in each ledge 22 is a side opening 30 which is disposed in the side wall 14 and extends through the ledge of the container 10. As shown in the drawings, the spaced side openings 30 preferably extend through the side wall 14 below the ledges 22 a short distance.

Figure 5:
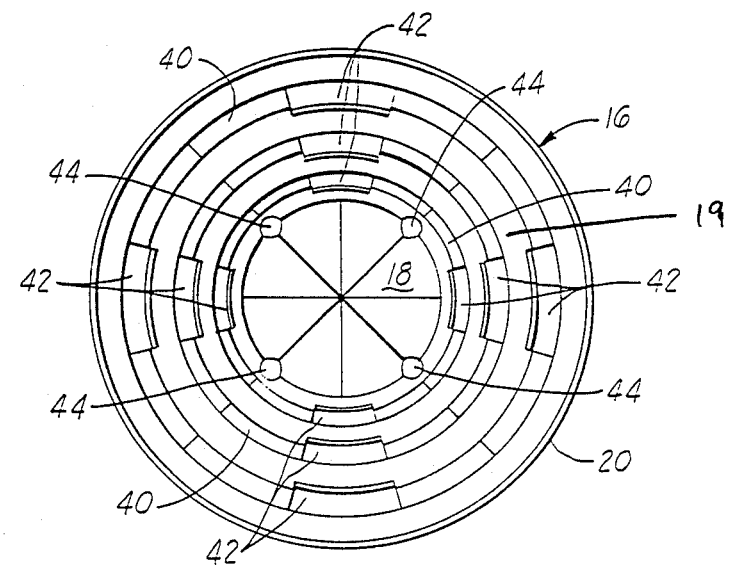
FIG. 5 is a top plan view of a container similar to the container illustrated in FIGS. 1 through 4, but of circular cross section rather than square cross section.

As shown in FIGS. 1, 2 and 4, the bottom wall 12 is preferably of pyramidal shape and four equally spaced lower openings 32 are positioned around the intersection of the perimeter of the bottom wall 12 and side wall 14. Referring specifically to FIG. 4, the pyramidal bottom wall 12 includes an apex 34 and eight flat triangular sides 36 extending from the apex 34 to the side wall 14. Each of the lower openings 32 is formed in the side wall 14 and in portions of adjacent triangular sides 36 forming the bottom wall 12. In a preferred configuration, each side 36 of the pair of adjacent sides 36 which contain an opening 32 slopes downwardly toward the opening 32 from the apex 34 and from the intersection with an adjacent side 36.

Similarly to the container 10 of square cross-sectional shape, the container 16 of circular cross-sectional shape includes a plurality of upwardly facing substantially horizontal internal ledges 40 positioned in spaced relationship one above the other. Each of the ledges 40 follows an undulating path around the interior of the side wall 20 of the container 16 with spaced side openings 42 disposed in the side wall and extending through the ledges 20 at the low points in such path. The bottom wall 18 is similar to the bottom wall 12 of the container 10 in that it is pyramidal in shape, and four lower openings 44 are disposed in the bottom wall 18 and the side wall 20 at the low areas of the bottom wall 18.

In carrying out the method of the present invention, growing medium is placed in a container of the present invention, and a seed or seedling is planted in the growing medium. The description of the method which follows will refer to the container 10, but it is to be understood that the method applies equally to the container 16 as well as to other differently configured containers of the present invention.

The tap root formed by the plant in the growing medium rapidly extends to the bottom wall 12 of the container 10. Upon contact with the bottom wall 12, the pyramidal shape thereof causes the tap root to follow the sloping sides 36 thereof to one of the openings 32 or into contact with the side wall 14 of the container 10 and then to one of the openings 32. Upon extending through an opening 32, the tip of the tap root is air-pruned, i.e., the portion of the root extending into the air is killed by desiccation. When the tap root growth is thus terminated, secondary lateral roots are developed along the length of the tap root within the container and growing medium. The secondary lateral roots grow outwardly around and from the tap root towards the side wall 14 of the container 10 at intervals along the length of the tap root. Upon reaching and contacting the internal surface of the side wall 14, the lateral roots are guided downwardly into contact with one of the ledges 22. The sloping flat portions 26 of the ledges 22 guide the lateral roots in contact therewith towards the lower areas thereof containing the openings 30 causing the root tips to extend through the openings 30 and to be air-pruned as a result. As the lateral roots are air-pruned, root branching from the lateral roots occurs developing additional lateral roots which are guided by the side wall 14 and ledges 22 thereof through the openings 30 whereby they are also air-pruned, additional root branching occurs, and so on.

The method and container of the present invention thus result in the rapid growing of a plant having a root system comprised of a plurality of root tips positioned at all levels along the side wall of the container. Upon transplantation, new root growth extends from the root tips in all directions around the plant, quickly anchoring the plant and providing water and nutrients required for additional plant growth.

Figure 6:
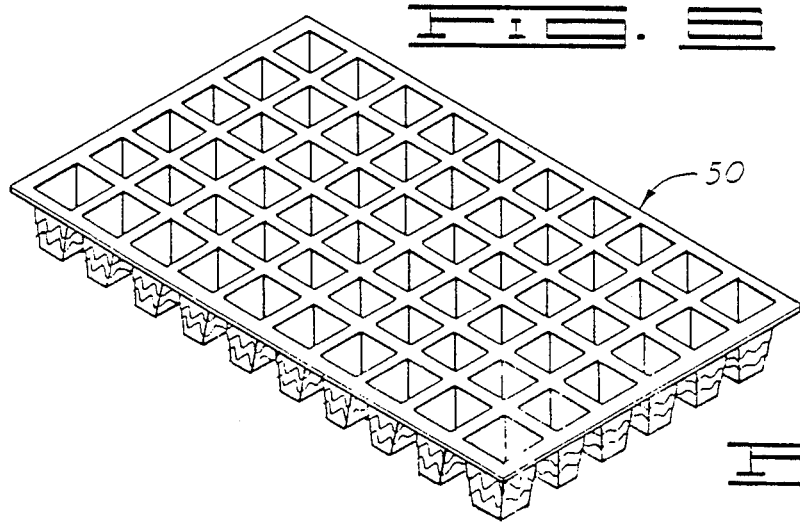
FIG. 6 is a perspective view of a flat including a plurality of containers of the present invention.

Referring now to FIG. 6, a seedling flat comprising a plurality of containers of the present invention is illustrated and generally designated by the numeral 50. The seedling flat 50 can be utilized for growing a plurality of plants intended to be transplanted whereby the plants quickly develop the improved root growth described above. Further, the seedling flat 50 as well as the containers 12 and 16 can be economically produced from thermoplastic materials by vacuum forming or the like. The use of the seedling flat 50 or individual containers of the present invention for growing landscape and other plants above ground does not require wire screens or other special surfaces, and is more economical and beneficial as compared to prior art methods and containers.

While preferred embodiments of the present invention have been described for purposes of this disclosure, numerous changes in the construction and arrangement of container parts will suggest themselves to those skilled in the art, which changes are encompassed within the spirit of this invention as defined by the appended claims.

What is claimed is:

1. In a method of growing a plant for transplantation in a growing medium contained in a container having a bottom wall and an upwardly extending side wall connected thereto, the improvement comprising trapping roots growing laterally within said container with a plurality of upwardly facing internal ledges positioned in spaced relationship one above the other on said side wall and guiding said roots trapped by said ledges through a plurality of spaced side openings disposed in said side wall, each of said openings extending through one of said ledges, said ledges being positioned on said side wall and said openings disposed in said side wall such that roots growing laterally within said container are trapped by said ledges, are guided by said ledges through said openings and are air-pruned as a result thereof.

2. The method of claim 1 wherein each of said ledges extends around the interior of said side wall.

3. The method of claim 2 wherein said side wall is of an inverted truncated pyramidal shape.

4. The method of claim 2 wherein said side wall is of an inverted truncated conical shape.

5. The method of claim 2 wherein said bottom wall is of a pyramidal shape.

6. The method of claim 5 wherein each of said ledges follows an undulating path around the interior of said side wall and said spaced side openings extend through said ledges at the low points of said path.

7. The method of claim 2 which is further characterized to include the step of guiding roots growing within said container with said bottom wall through a plurality of lower openings disposed in said side wall and said bottom wall along the perimeter of said bottom wall whereby said roots guided through said openings are air-pruned as a result thereof.

8. An improved container for growing a plant intended to be transplanted comprising:
   a bottom wall; and
   an upwardly extending side wall connected to the perimeter of said bottom wall forming a container having an open top, said side wall including an inside surface, an outside surface, a plurality of upwardly facing internal ledges positioned in spaced relationship one above the other on said inside surface and a plurality of spaced side openings disposed therein, each of said side openings extending through one of said ledges, said ledges being positioned on said inside surface and said openings disposed on said side wall such that roots growing laterally within said container are trapped by said ledges, are guided by said ledges through said openings and are air-pruned as a result thereof.

9. The container of claim 8 which is further characterized to include a plurality of spaced lower openings disposed in said side wall and said bottom wall along the perimeter of said bottom wall.

10. The container of claim 9 wherein each of said ledges extends around the interior of said side wall.

11. The container of claim 10 wherein said side wall is of an inverted truncated pyramidal shape.

12. The container of claim 10 wherein said side wall is of an inverted truncated conical shape.

13. The container of claim 10 wherein said bottom wall is of a pyramidal shape.

14. The container of claim 10 wherein each of said ledges follows an undulating path around the interior of said side wall and said spaced side openings extend through said ledges at the low points in said path.

15. In an open-topped container for growing a plant intended to be transplanted having a bottom wall, an upwardly extending side wall connected thereto and at least one lower opening in said bottom wall, the improvement which comprises a plurality of upwardly facing internal ledges positioned on said side wall and extending in spaced relationship one above the other around the interior thereof and a plurality of spaced side openings disposed in said side wall, each of said side openings extending through one of said ledges, said ledges being positioned on said side wall and said openings disposed in said side wall such that roots growing laterally within said container are trapped by said ledges, are guided by said ledges through said openings and are air-pruned as a result thereof.

16. The container of claim 15 wherein said side wall is of an inverted truncated pyramidal shape.

17. The container of claim 15 wherein said side wall is of an inverted truncated conical shape.

18. The container of claim 15 wherein said bottom wall is of a pyramidal shape.

19. The container of claim 15 wherein each of said ledges follows an undulating path around the interior of said side wall and said spaced side openings extend through said ledges at the low point in said path.

* * * * *

UNITED STATES PATENT AND TRADEMARK OFFICE
CERTIFICATE OF CORRECTION

PATENT NO. : 4,753,037
DATED : June 28, 1988
INVENTOR(S) : Carl E. Whitcomb

It is certified that error appears in the above-identified patent and that said Letters Patent are hereby corrected as shown below:

Column 2, line 19, delete the words "side wall"; and
Column 4, line 27, delete the numeral "20".

Signed and Sealed this

Eighth Day of November, 1988

Attest:

DONALD J. QUIGG

*Attesting Officer*  *Commissioner of Patents and Trademarks*